United States Patent [19]

Takanashi et al.

[11] Patent Number: 5,239,322

[45] Date of Patent: Aug. 24, 1993

[54] DISPLAY APPARATUS

[75] Inventors: Itsuo Takanashi, Kamakura; Shintaro Nakagaki, Miura; Ichiro Negishi; Tetsuji Suzuki, both of Yokosuka; Fujiko Tatsumi, Yokohama; Ryusaku Takahashi, Yokosuka; Keiichi Maeno, Yokosuka, all of Japan

[73] Assignee: Victor Company of Japan, Ltd., Yokohama, Japan

[21] Appl. No.: 700,471

[22] Filed: May 15, 1991

[30] Foreign Application Priority Data

Jun. 16, 1990 [JP] Japan .................... 2-126313

[51] Int. Cl.$^5$ .................... G02F 1/13; G03B 21/00
[52] U.S. Cl. .................... 353/31; 353/30; 353/33; 353/81; 359/40; 359/63
[58] Field of Search .................... 353/88, 89, 33, 34, 353/31, 37, 98, 99, 20, 81; 359/40, 48, 63, 65, 72, 93

[56] References Cited

U.S. PATENT DOCUMENTS

| | | | |
|---|---|---|---|
| 4,384,769 | 5/1983 | Brei et al. | 353/31 |
| 4,389,096 | 6/1983 | Hori et al. | 359/72 |
| 4,707,077 | 11/1987 | Marom | 359/48 |
| 4,818,983 | 4/1989 | Hara et al. | 359/40 |
| 5,009,490 | 4/1991 | Kouno et al. | 359/48 |
| 5,083,854 | 1/1992 | Zampolin et al. | 353/122 |

FOREIGN PATENT DOCUMENTS

1-30151 6/1989 Japan .
2-250029 10/1990 Japan .

Primary Examiner—William A. Cuchlinski, Jr.
Assistant Examiner—William C. Dowling
Attorney, Agent, or Firm—Michael N. Meller

[57] ABSTRACT

There is provided an apparatus for displaying an image on a screen by projecting a reading light from a light source onto a spatial light modulator of reflective type in which the image is written, and projecting a reflected light from the modulator corresponding to the image onto the screen through a projection lens, the modulator, lens and screen being provided so that their optical axes are in agreement on one optical path. The apparatus comprises an optical device provided between the lens and screen for the reading light toward the modulator and passing the reflected light to the screen and a converging element for converging the reading light on the position which is on the optical axis of the lens and located between the lens and screen so that the reading light thus turned becomes a parallel pencil beam which is projected onto the modulator in parallel with the optical axis.

10 Claims, 7 Drawing Sheets

DISPLAY APPARATUS

BACKGROUND OF THE INVENTION

The present invention relates to a display apparatus.

Conventionally known types of display apparatus include those that use a photographic film such as slide projectors, those that display images on an image-receiving tube using image signals, and the like.

However, in these conventional display apparatus, it is not possible to display images that have a high resolution and so a display apparatus that enables high resolution image display is required.

In order to display high resolution images, one display apparatus has been developed which has a spatial light modulator of reflective type having a configuration that includes a photoconductive layer member between two electrodes, a photomodulation layer member having a photomodulating material that changes the optical nature such as the status of light scattering, birefringence and rotary polarization of light incident thereto in accordance with an electrical field applied thereto.

Figure 1:
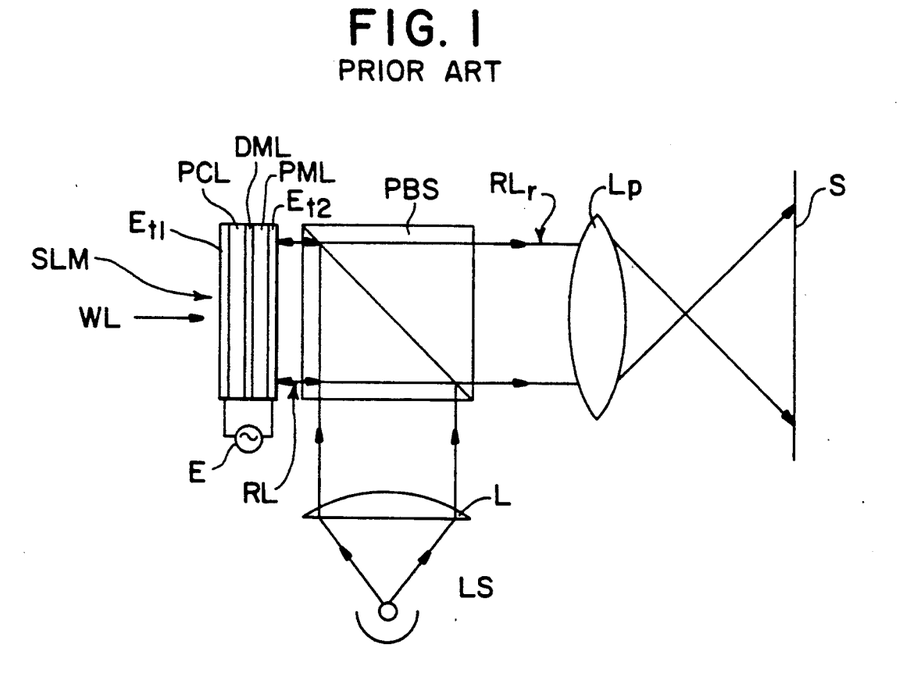
FIG. 1 is a view describing a conventional display apparatus which uses a reflective type spatial light modulator of birefringence mode.

FIG. 1 is a view of one configuration of a conventional display apparatus using a spatial light modulator SLM of reflective type provided with a photomodulation layer member using a photomodulating material that performs birefringence operation.

The spatial light modulator SLM in FIG. 1 has a power source E connected to electrodes Et1 and Et2 and has an electrical field applied to a photomodulation layer member PCL, so that when a writing light WL is irradiated to the spatial light modulator SLM from the side of the electrode Et1 in the status where the optical intensity of the writing light WL is modulated by the information which is the object of display, that irradiated light WL passes through the electrode Et1 to reach the photoconductive layer member PCL.

The value of the electrical resistance of the photoconductive layer member PCL changes in accordance with the intensity distribution of the light WL that reaches it. This results in a charge image generated having an intensity distribution that corresponds to the intensity distribution of the light WL on the boundary surface between a dielectric mirror DML and the photoconductive layer member PCL.

When non-polarized light radiated from a light source LS via a lens L is incident to a polarization beam splitter PBS, only the S-polarized light is reflected by the beam splitter PBS.

The S-polarized light is irradiated to the spatial light modulator SLM on which the charge image is formed on the side of the electrode Et2 via beam splitter PBS as a reading light RL.

The S-polarized reading light RL passes through a photomodulation layer member PML of birefringence type and is then reflected by a dielectric mirror DML, again passes through the photomodulation layer member PML and is irradiated from the electrode Et2 in the status where the polarization plane of the reading light RL changes in accordance with the charge image described above.

The reading light RL irradiated from the electrode Et2 is irradiated to the polarization beam splitter PBS and only the P-polarized light RLr is applied to a projection lens Lp and is projected to a display screen S.

In the conventional display apparatus shown in FIG. 1, the reading light RL is irradiated parallel to the optical axis of the spatial light modulator SLM and the projection lens Lp is provided along the path of the light RLr irradiated from the polarization beam splitter PBS. So the back focal distance (the distance between the modulator SLM and the lens $L_p$) becomes large and a wide angle lens cannot be used, accordingly there is the problem that the configuration of a display apparatus that displays large-screen images cannot be made compact.

SUMMARY OF THE INVENTION

The present invention provides a display apparatus which uses a spatial light modulator of reflective type. The display apparatus has an optical element such as a polarization beam splitter disposed between a screen and a projection lens so that the back focal distance can be shortened. Furthermore, by focussing a reading light from the light source, in the vicinity of the focal point (hereinafter termed the forward focal point) of the projection lens on the side of the screen, it is possible to realize a compact display apparatus that solves the problems described above.

Furthermore, the projection light that is reflected from the spatial light modulator described above is made to pass through a small-diameter opening provided at the position of the forward focal point of the projection lens so that it is possible to remove scattering light that lowers the contrast of the display image and to realize a display apparatus that has a high contrast.

The other objects and features of this invention will become understood from the following description with reference to the accompanying drawings.

DETAILED DESCRIPTION OF THE PREFERRED EMBODIMENTS

The present invention will be described in detail with reference to the accompanying drawings.

Throughout the drawings, like reference numerals and letters are used to designate like or equivalent elements for the sake of simplicity of explanation.

Figure 2:
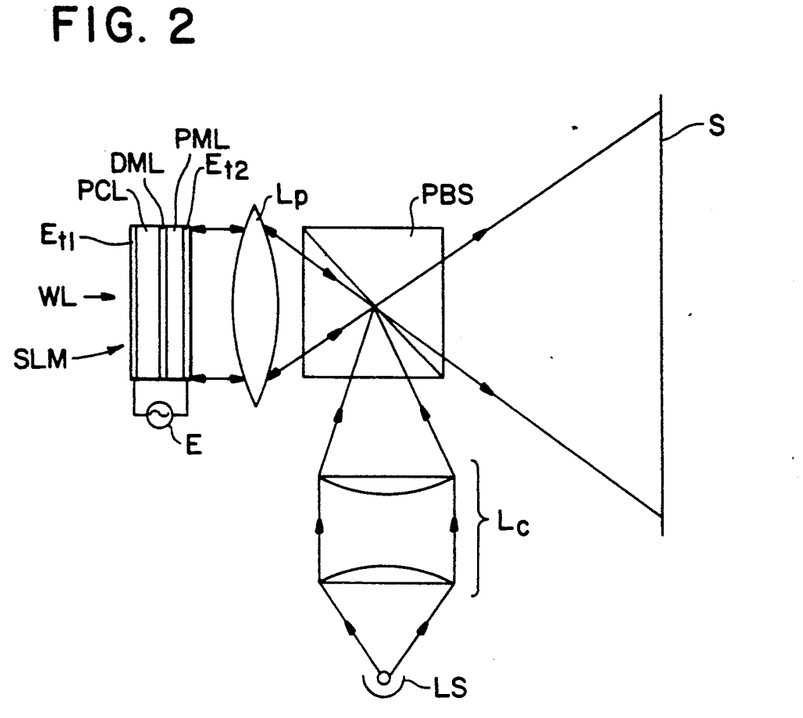
FIGS. 2 to 6 and 8 to 12 are views that show from a first embodiment to a tenth embodiment of a display apparatus according to the present invention and which uses a reflective type spatial light modulator of birefringence mode.

FIG. 2 is a view of a first embodiment of the display apparatus of the present invention. In the display apparatus shown in FIG. 2, a spatial light modulator SLM of reflective type is configured from a transparent electrode Et1, a photoconductive layer member PCL, a dielectric mirror DML (which can be omitted if the photoconductive layer member PCL reflects a reading light RL and does not have a sensitivity towards the reading light RL), a photomodulation layer member PML using a photomodulation material which performs birefringence operation (such as a photomodulation layer member PML using a liquid crystal which performs birefringence operation, or a photomodulation layer member PML using lithium niobate) and a transparent electrode Et2 (This spatial light modulator SLM is the same as the spatial light modulator used in the conventional display apparatus described earlier with reference to FIG. 1).

To the forward surface of the transparent electrode Et2 on the side of read in the spatial light modulator SLM, a projection lens Lp is disposed so that the principle plane of the lens Lp is parallel to the surface of the transparent electrode Et2 (the surface of the photomodulation layer member PML). It is desirable that the optical axes of the spatial light modulator SLM and the projection lens Lp be disposed so that they are completely or approximately in agreement.

To the forward surface of the projection lens Lp is disposed a polarization beam splitter PBS. Unpolarized light as a reading light which is irradiated from a light source LS, is made a fine image of the light source LS in a portion that is in the extreme vicinity of the position of the optical axis of the polarization section in the polarization beam splitter PBS by a condenser lens Lc.

The polarization beam splitter PBS reflects the S-polarized light in the reading light irradiated thereto, and irradiates the S-polarized light to the projection lens Lp. The S-polarized as the reading light and which is in the substantially parallel status that is, being collimated, is emitted from the projection lens Lp and irradiated to the transparent electrode Et2, substantially perpendicular to the surface of the spatial light modulator SLM.

When a writing light WL carrying information which is the object of display is applied to the transparent electrode Et1 of the spatial light modulator SLM, a charge image corresponding to the optical intensity of the writing light WL is generated as described above with reference to FIG. 1, at the border between the photoconductive layer member PML and the dielectric mirror DML, and as a result, the electrical field due to the this charge image is applied to the photomodulation layer member PML.

Then, the S-polarized light as the reading light irradiated to the spatial light modulator SLM from the projection lens Lp passes through the transparent electrode Et2, the photomodulation layer member PML and reaches the dielectric mirror DML. The reading light is reflected by the dielectric mirror DML and passes through the photomodulation layer member PML and the transparent electrode Et2 and is irradiated from the spatial light modulator SLM substantially perpendicular to the surface thereof.

The reading light emitted from the transparent electrode Et2 is in a status where the polarization plane of the light changes in accordance with the field intensity due to the charge image while the reading light travels through and back through the photomodulation layer member PML to which the electrical field applied.

When the reading light emitted from the spatial light modulator SLM is focussed by the projection lens Lp and irradiated to the polarization beam splitter PBS, the P-polarized light of that reading light passes therethrough and is projected on a display screen S as an image.

Figure 3:
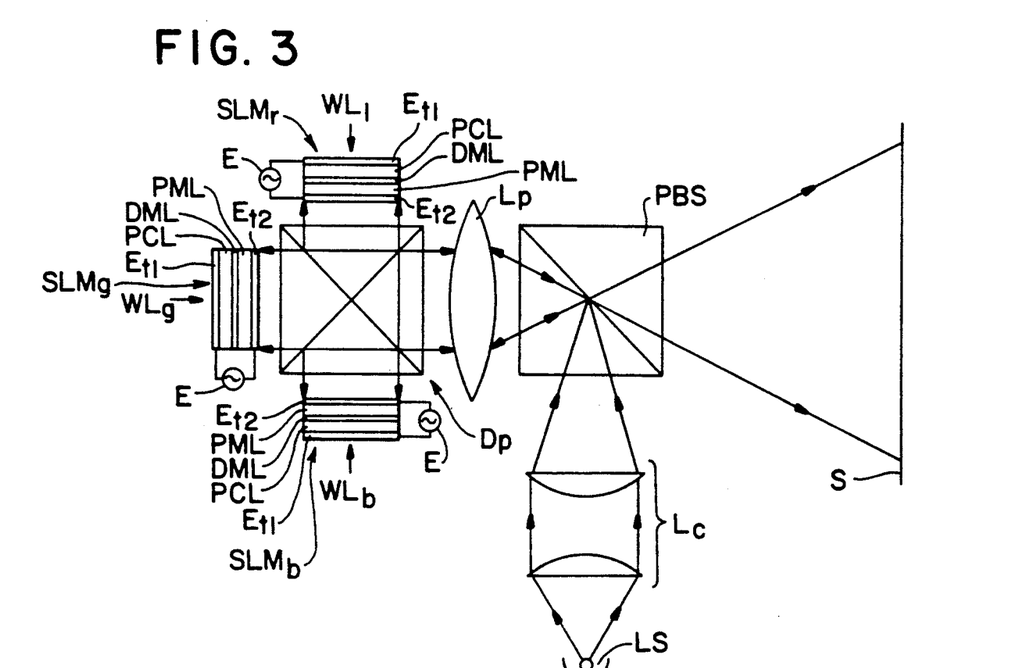

FIG. 3 shows an example of a second embodiment of the display apparatus according to the present invention, and shows the configuration of a display apparatus described with respect to FIG. 1, for the display of color images. In the display apparatus shown in FIG. 3, when the S-polarized reading light reflected by the polarization beam splitter PBS is irradiated to the projection lens Lp, the S-polarized reading light becomes in the status where it is substantially parallel and is irradiated to the dichroic prism DP that is used as a 3-color splitting and synthesis optical system, and is split into three colors.

Of the S-polarized reading light that has been color split by the dichroic prism DP, the S-polarized reading light which is red in color is irradiated to the read side in the write spatial light modulator SLMr of reflective type to which the information of the red color is written by a write light WLr, the S-polarized reading light which is green in color is irradiated to the read side of the spatial light modulator SLMg of reflective type to which the information of the green color is written by a write light WLg, and the S-polarized reading light which is blue in color is irradiated to the read side of the spatial light modulator SLMb of reflective type to which the information of the green color is written by a write light WLb.

The status of the reading light of each of the colors irradiated to the spatial light modulators SLMr, SLMg and SLMb for each of the colors is in the same status as the read light that is irradiated to the spatial light modulator SLM with respect to FIG. 2. The S-polarized reading light is irradiated to the respective transparent electrode Et2 and photomodulation layer member PML of the spatial light modulators SLMr, SLMg and SLMb for each of the colors, in the status where it is substantially perpendicular.

The S-polarized reading light that is irradiated to each of the spatial light modulators SLMr, SLMg and SLMb for each of the colors passes through the transparent electrode Et2, the photomodulation layer member PML and reaches dielectric mirror DML. The reading light is reflected by the dielectric mirror DML and passes through the photomodulation layer member PML and the transparent electrode Et2 and is emitted from the spatial light modulators SLMr, SLMg and SLMb for each of the colors. However, each reading light that is linearly polarized and which is emitted from the spatial light modulators SLMr, SLMg and SLMb for each of the colors, is in the status where the polarization plane is rotated corresponding to the field intensity due to the charge image generated at the boundary between the dielectric mirror DML and the photoconductive layer member PCL corresponding to the respective writing lights WLr, WLg and WLb, while each reading light travels through and back through the photomodulation layer member PML to which an electrical field due to the charge image is applied.

Then, the linearly polarized reading light which is emitted from the transparent electrode Et2 of each of the spatial light modulators SLMr, SLMg and SLMb for each of the colors, is irradiated to the projection lens Lp after it has been 3-color synthesized by the dichroic prism DP. The linearly polarized reading light that is focussed by the projection lens Lp is irradiated to the polarization beam splitter PBS. The polarization beam splitter PBS passes the P-polarized light of that irradiated linearly polarized light and emits it to be projected onto the display screen S as a color image.

Figure 4:
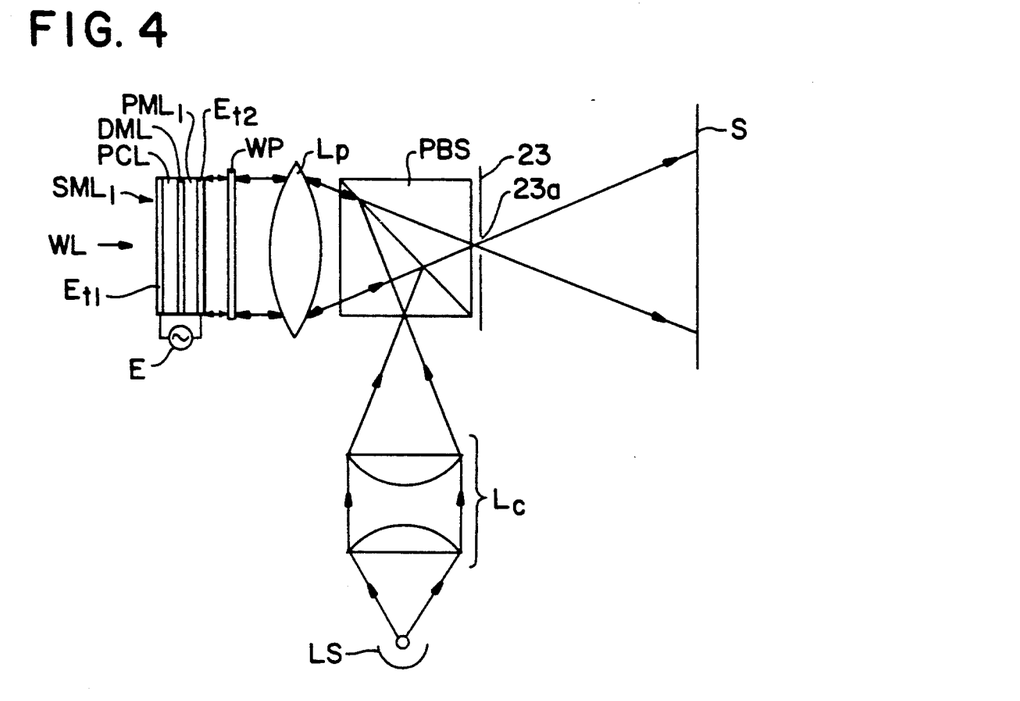
Figure 5:
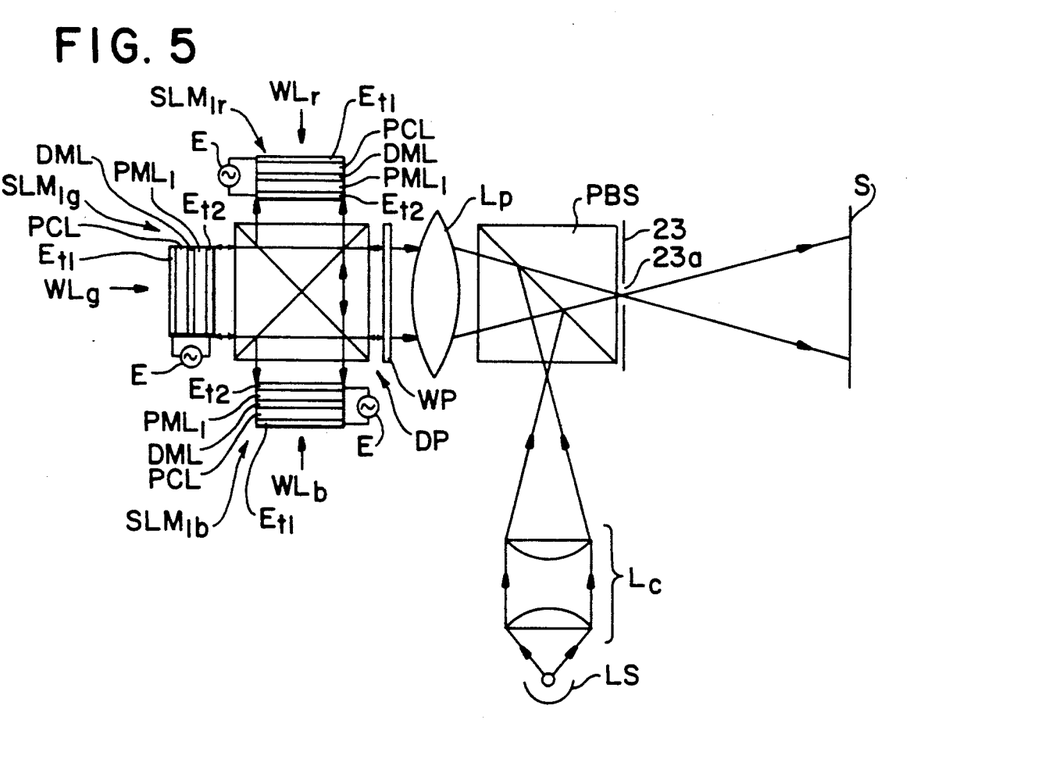

FIGS. 4 and 5 show third and fourth embodiments of the display apparatus of the present invention. These are examples of the configuration of an spatial light modulator SLM$_1$ provided with a photomodulation layer member PML$_1$ using a photomodulation material that performs scattering operation (such as a photomodulation layer member PML$_1$ using a polymer dispersed liquid crystal film which has high-resistance liquid crystals scattering in a high-polymer material performing scattering operation or a photomodulation layer member PML₁ using lead lanthanum zirconate titanate performing scattering operation, or the like), and the differences in the configurations of the display apparatus shown in FIGS. 4 and 5, and the configurations of the display apparatus shown in FIGS. 2 and 3 are that the display apparatus shown in FIGS. 4 and 5 have a ¼ wavelength plate WP inserted along the optical path of the S-polarized reading light that is emitted from the projection lens Lp, and that a pinhole plate 23 is provided so as to remove the unnecessary scattering light from among the light emitted from the polarization beam splitter PBS and passing through the pinhole 23a.

As shown in FIG. 4, the condenser lens Lc and the light source LS are provided such that the light from the light source LS is focussed in the vicinity of the forward focal point of the lens Lp. Also, the position of this point where the light is focussed and the pinhole 23a is the same optical distance with respect to the lens Lp.

In the display apparatus shown in FIG. 4, the S-polarized reading light in the substantially parallel status and which is emitted from the projection lens Lp, is converted into circularly polarized light by the wavelength plate WP and is then irradiated to the transparent electrode Et2 in the spatial light modulator SLM₁ be substantially perpendicular to the surface of the spatial light modulator SLM₁.

A charge image corresponding to the writing light WL is generated at the boundary between the dielectric mirror DML and the photoconductive layer member PCL in the spatial light modulator SLM and so an electrical field corresponding to the charge image is applied to the photomodulation layer member PML₁.

Then, the circularly polarized reading light that is irradiated from the projection lens Lp to the spatial light modulator SLM₁ of reflective type passes through the transparent electrode Et2, the photomodulation layer member PML₁ and reaches the dielectric mirror DML. The reading light is reflected by the dielectric mirror DML and passes through the photomodulation layer member PML₁ and the transparent electrode Et2 and is emitted from the spatial light modulator SLM₁ in the status substantially perpendicular to the surface of the spatial light modulator SLM₁.

The circularly polarized reading light that is emitted from the transparent electrode Et2 in the spatial light modulator SLM₁ is in the status where there is light scattering corresponding to the field intensity of the previously described charge image, while the circularly polarized light travels through and back through the photomodulation layer member PML₁ to which is applied an electrical field due to the charge image.

More specifically, the photomodulation layer member PML₁ using a photomodulation material that performs the previously described scattering operation has the status of the scattering with respect to the light changing in accordance with the electrical field due to the charge image generated corresponding to the writing light WL. So the circularly polarized reading light that is emitted from the spatial light modulator SLM₁ and substantially parallel to the optical axis of the projection lens Lp is in the status where there is intensity modulation corresponding to the information that is carried by the writing light WL.

Then, the circularly polarized light that is emitted from the spatial light modulator SLM₁ is focussed by the projection lens Lp after it has been converted into linearly polarized light by the wavelength plate WP, and is irradiated to the polarization beam splitter PBS. In the polarization beam splitter PBS, the P-polarized light of that reading light which is the irradiated linearly polarized light, passes through and is irradiated to the pinhole plate 23. The pinhole plate 23 operates to remove the unnecessary scattering light, and only the read light that passes through the pinhole 23a is projected as the image to the display screen S.

When there is scattering operation performed in a photomodulation layer member of a spatial light modulator of reflective type, light is emitted in the status of scattering light, from the portion of the photomodulation layer corresponding to a dark portion of the image to be projected onto a display screen. So when that light reaches the screen, this results in a lowering of the contrast of the image. However, in the example shown in FIG. 4, the pinhole 23a selectively passes only the light component that is reflected perpendicularly from the spatial light modulator SLM₁ and so it is possible to display an image having high contrast.

The display apparatus shown in FIG. 5 has a configuration where there is added a 3-color splitting and synthesis optical system to the display apparatus shown in FIG. 4, and is provided with a reflective type spatial light modulator SLM₁r, SLM₁g and SLM₁b for each color. The operation can be easily understood from the configuration shown in FIG. 4 and the disclosure with respect to FIG. 4 and so details of it will be omitted here.

Figure 6:
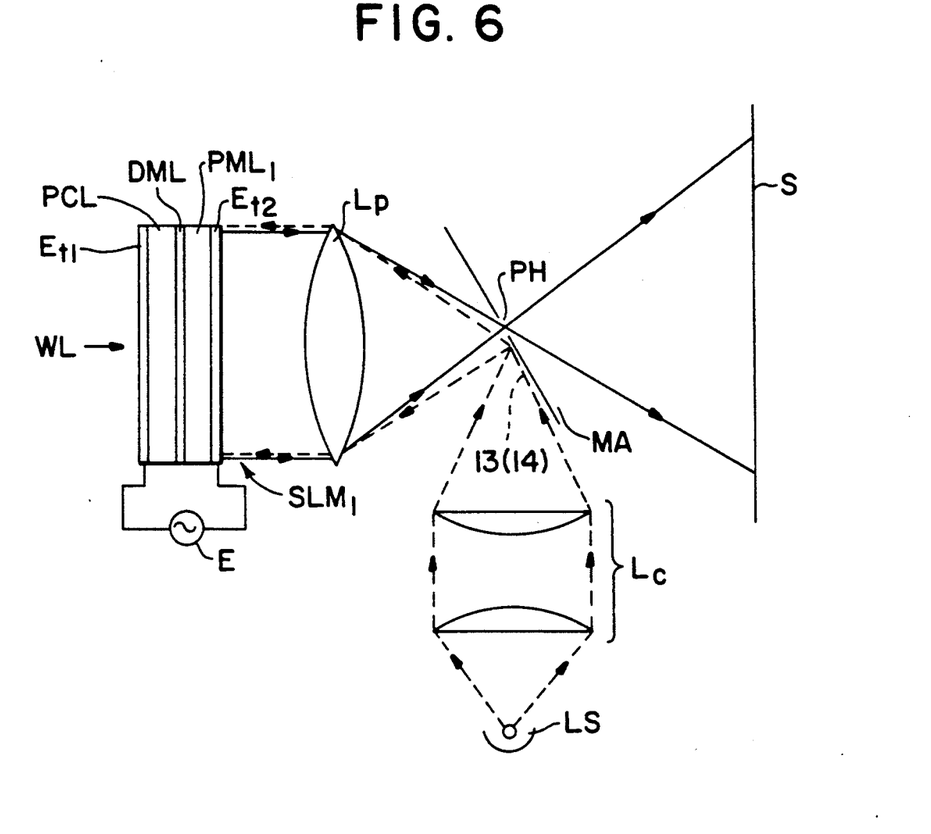

FIG. 6 shows a fifth embodiment of the display apparatus of the present invention.

To the forward surface of the transparent electrode Et2 on the read side in the spatial light modulator SLM₁ of reflective type is disposed a projection lens Lp so that the principal plane of the lens Lp is parallel with respect to the surface of the transparent electrode Et2. It is desirable that the optical axes of the projection lens Lp and the spatial light modulator SLM₁ are disposed so that they are either in agreement or substantially in agreement.

In addition, an optical member MA that is configured with a reflecting mirror (and hereinafter termed simply the optical member MA) is configured so that at least the portion to which the light from the light source LS is irradiated is the reflecting mirror. The optical member MA also has the portion to which the reading light irradiated from the spatial light modulator SLM₁ in the status where it is modulated by the image information in the spatial light modulator SLM₁, is irradiated and which passes that reading light. Two embodiments of the optical member MA are shown in FIGS. 7A and 7B.

Figure 7A:
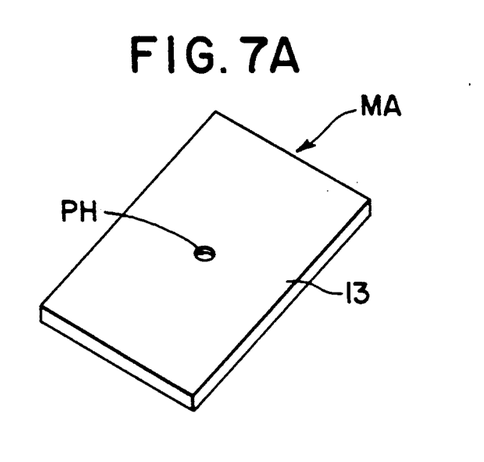
FIGS. 7A and 7B are views of embodiments of an optical member MA used in the display apparatus of the present invention.
Figure 7B:
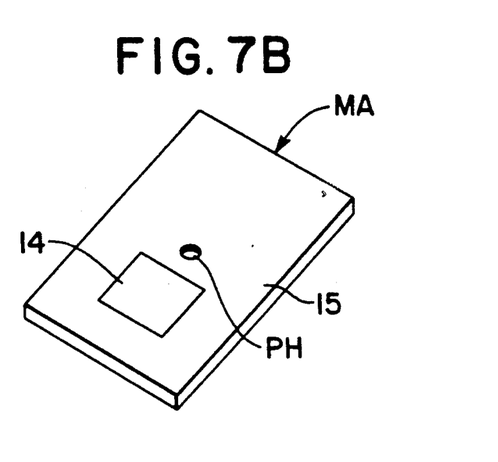

One embodiment of the optical member MA shown in FIG. 7A is configured so that it is provided with a pinhole PH in the central portion of a reflector surface (mirror surface) portion 13 formed over the substrate. The other embodiment of the optical member MA that is shown in FIG. 7B forms a reflector surface (mirror surface) portion 14 in only one portion on the substrate, with portions other than the previously described reflector surface portion 14 being made a non-reflecting surface 15 (with it being desirable for example, that it be made black in color), and there also being provided a pinhole PH in this non-reflecting surface portion 15.

The optical member MA can be provided with a cold mirror that reflects visible light and that absorbs heat rays, such as glass that absorbs infrared rays.

In the display apparatus shown in FIG. 6, the optical member MA has the portion of the pinhole PH disposed so that it is slightly skewed from the optical axis of the projection lens Lp, and also has the reflector surface of that reflector surface portion 13 (14) which is disposed such that it faces the projection lens Lp and is inclined at a predetermined angle with respect to the optical axis of the projection lens Lp so that it is not parallel to the principal plane of the projection lens Lp.

The unpolarized reading light that is emitted from the light light source LS is supplied to the condenser lens Lc. By the condenser lens Lc, the reading light is made a fine image of the light source LS in the vicinity of the position of the forward focal distance of the projection lens LP in the reflector surface portion 13 (14) and on the position extremely close to the pinhole PH provided in the optical member MA.

The reflector surface of the reflector mirror 13 (14) of the optical member MA reflects the reading light that is irradiated thereto and irradiates the reading light to the projection lens Lp and the reading light is emitted from the projection lens Lp in the status where it is substantially parallel to the optical axis. Then, the reading light is irradiated to the transparent electrode Et2 in the spatial light modulator $SLM_1$ in the status substantially perpendicular to the surface of the spatial light modulator $SLM_1$.

The reading light that is irradiated to the spatial light modulator $SLM_1$ passes through the transparent electrode Et2, the photomodulation layer member $PML_1$ and reaches the dielectric mirror DML. The reading light is reflected by the dielectric mirror DML and passes through the photomodulation layer member PML and the transparent electrode Et2 and is emitted from the transparent electrode Et2 in the status where it is substantially perpendicular to the spatial light modulator $SLM_1$.

The photomodulation layer member $PML_1$ using a photomodulation member that performs scattering operation, has a different scattering effect with respect to light in accordance with the electrical field due to the charge image generated corresponding to the writing light WL. So the reading light that is emitted from the spatial light modulator $SLM_1$ in the status where it is substantially parallel to the optical axis of the projection lens Lp, is intensity modulated corresponding to the information carried by the writing light WL.

The reading light that is emitted from the spatial light modulator $SLM_1$ of reflector type and is focussed by the projection lens Lp passes through the pinhole PH provided in the vicinity of the position of the spot of light from the light source LS in the reflector surface portion 13 (14) and is projected onto the display screen S as an image.

Since the scattering light that is generated by scattering action is cut by the optical member MA and does not reach the display screen S, it is possible to project a high-contrast image onto the display screen S.

Figure 9:
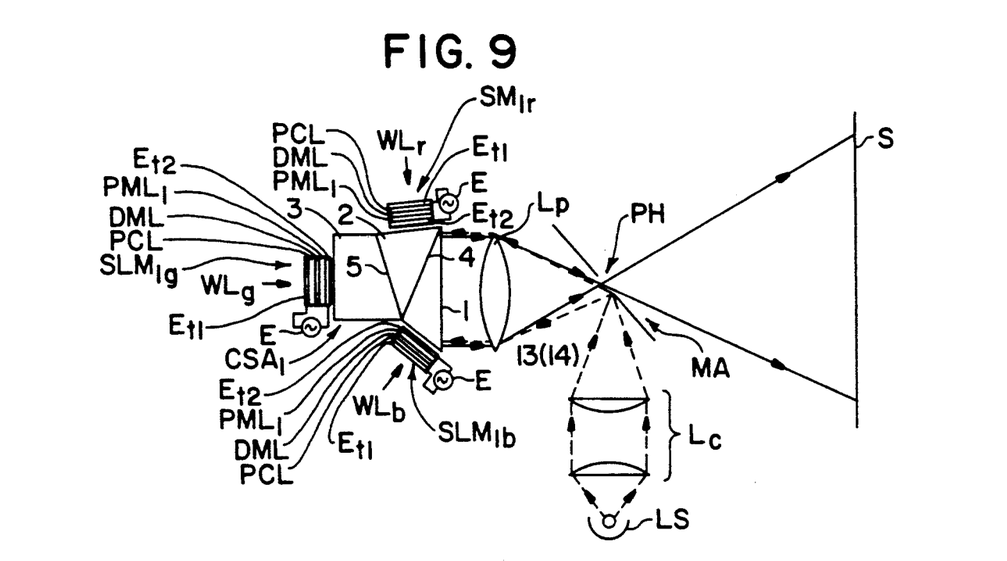
Figure 10:
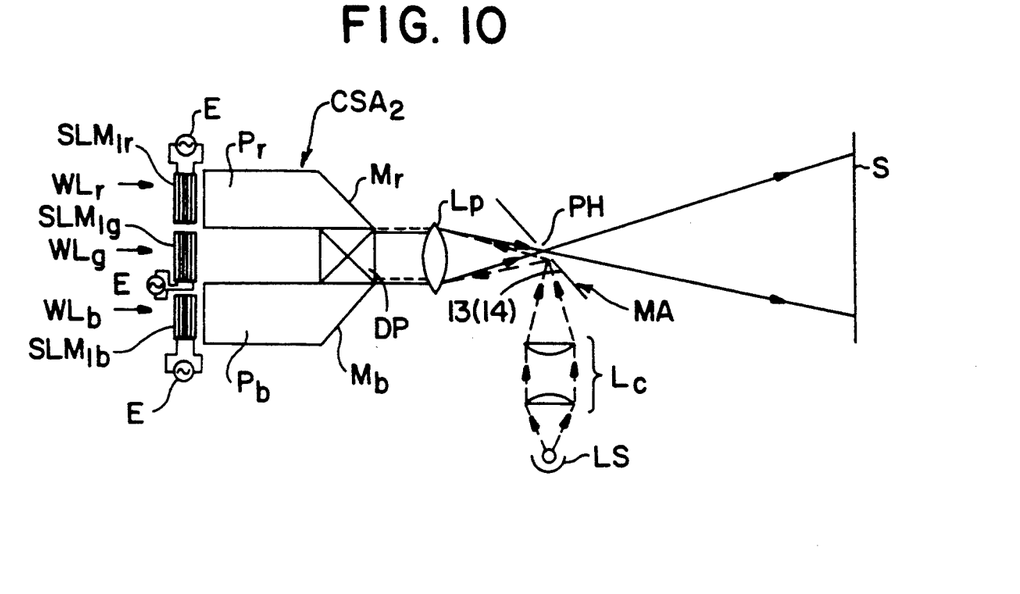
Figure 11:
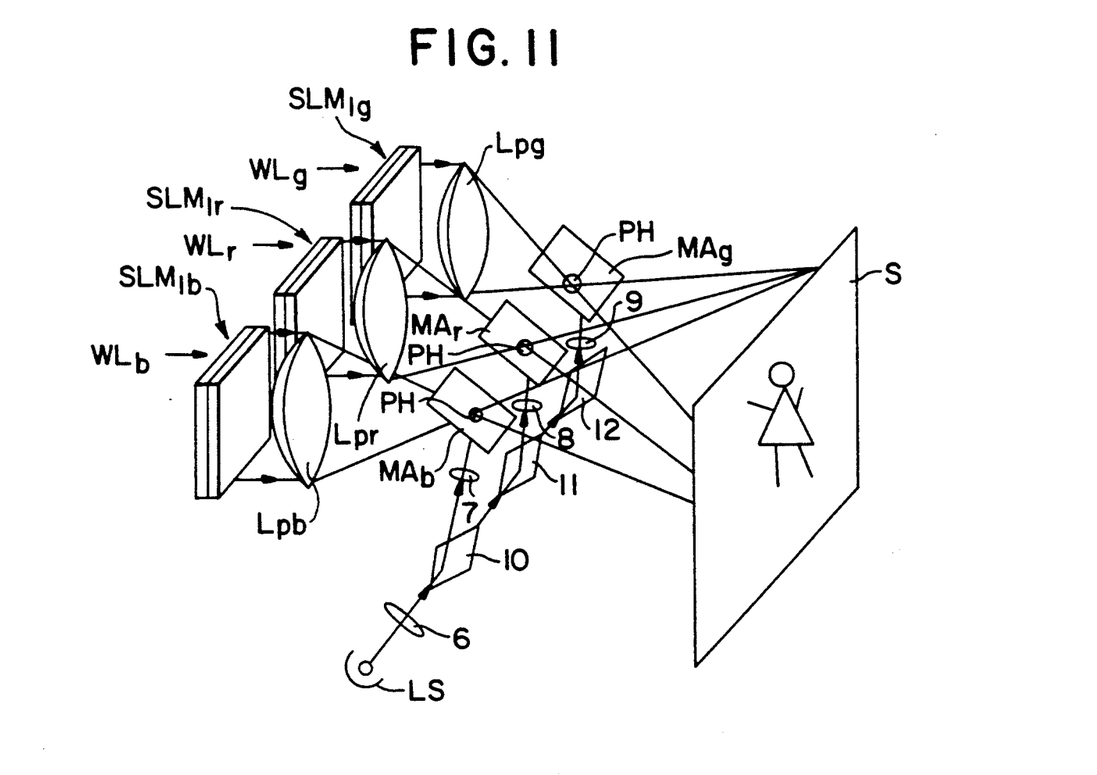

FIGS. 8 to 11 show sixth to ninth embodiments of the display apparatus of the present invention and show configurations of the display apparatus described with respect to FIG. 6, for the case when configured as display apparatus for color images. In the display apparatus shown in FIGS. 8 to 10, the configuration of the portions comprising the screen S, the condenser lens Lc and the light source LS, the optical member MA and the projection lens Lp are the same as the corresponding portions of the display apparatus described with respect to FIG. 6 and the display apparatus of FIG. 11 is configured with the display apparatus described with reference to FIG. 6 being provided for each color.

Figure 8:
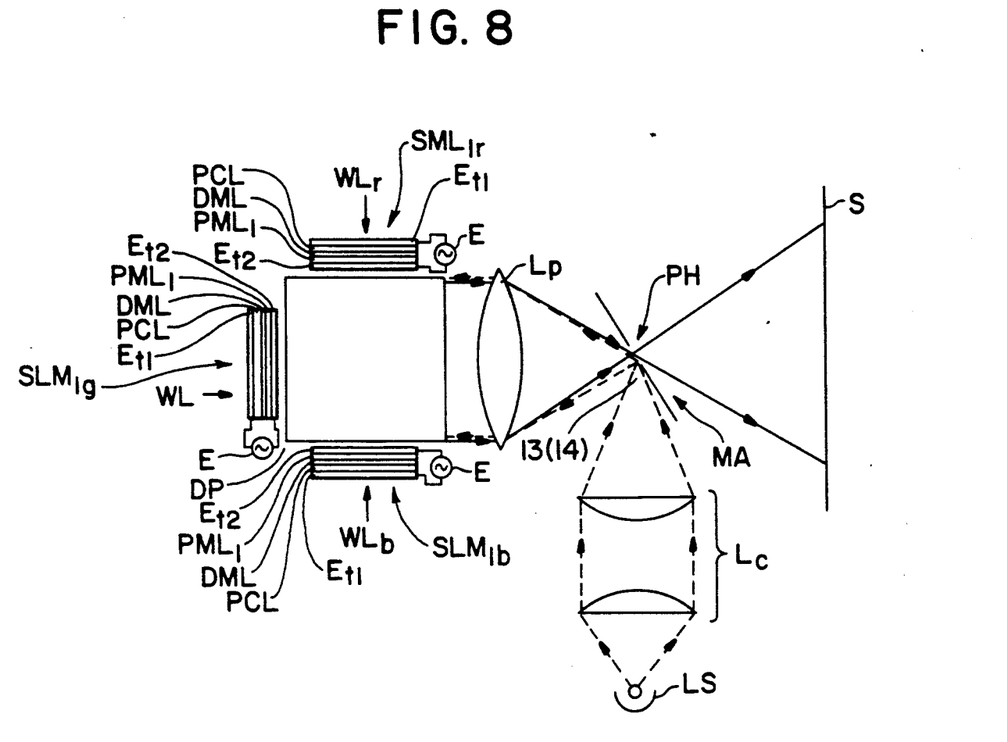

First, in the display apparatus shown in FIG. 8, the reading light that is emitted from the projection lens Lp in the status where it is substantially parallel light is irradiated to the dichroic prism DP that is used as the 3-color splitting and synthesis optical system. This dichroic prism DP splits the reading light that is irradiated thereto, into three colors. Of that light which is three-color split in the dichroic prism DP, the reading light which is of the red color is irradiated to the side of read in the spatial light modulator $SLM_1r$ of reflector type to which the information of the red color image is written by the write light WLr, the reading light which is of the green color is irradiated to the side of read in the spatial light modulator $SLM_1g$ of reflector type to which the information of the green color image is written by the write light WLg, and the reading light which is of the blue color is irradiated to the side of read in the spatial light modulator SLMb of reflector type to which the display information of the blue color image is written by the write light WLb.

The status of the reading light of each color irradiated to the read side of the spatial light modulator $SLM_1r$, $SLM_1g$ and $SLM_1b$ is the same as the status of the reading light that is irradiated to the read side of the spatial light modulator $SLM_1$ of reflector type in the display apparatus described with reference to FIG. 6.

The status of the reading light that is emitted from each transparent electrode Et2 of the spatial light modulators $SLM_1r$, $SLM_1g$ and $SLM_1b$ for each of the colors is also the same as the status of the reading light that is emitted from the transparent electrode Et2 of the spatial light modulator $SLM_1$ in the display apparatus of FIG. 6.

Then, the read light that is emitted from each transparent electrode Et2 of the spatial light modulator $SLM_1r$, $SLM_1g$ and $SLM_1b$ for each color is irradiated to the projection lens Lp after it has been three-color synthesized by the dichroic prism DP. Then, the reading light that is focussed by the projection lens Lp passes through the pinhole PH in the vicinity of the position of the spot of light from the light source LS in the reflector surface portion 13 (14) of the optical member MA and is projected onto the screen S as a color image.

Then, the display apparatus shown in FIGS. 9 and 10 is a display apparatus that is configured using a 3-color splitting and synthesis optical system having a configuration other than the dichroic prism DP that was used in the display apparatus described with reference to FIG. 8 but those portions other than the portions of the 3-color splitting and synthesis optical system in the display apparatus shown in FIGS. 9 and 10 are the same as those of the display apparatus shown in FIG. 8.

In the display apparatus shown in FIG. 9, the read light that is emitted from the projection lens Lp in the status where it is substantially parallel light is irradiated to a prism 1 in a 3-color splitting and synthesis optical system CSA 1.

The light of the wavelength region of green light in the reading light which is irradiated to the prism 1 passes through both of dichroic filters 4 and 5 and is emitted from a prism 3 in the 3-color splitting and synthesis optical system CSA 1 and then irradiated so that it is substantially perpendicular to the spatial light modulator $SLM_1g$ of reflector type. The light of the wavelength region of red light in the reading light which is irradiated to the prism 1 passes through the dichroic filter 4, is reflected by the dichroic filter 5 and is emitted from a prism 2 in the 3-color splitting and synthesis optical system CSA 1 and then irradiated so that it is substantially perpendicular to the spatial light modulator $SLM_1r$ of reflector type. The light of the wavelength region of blue light in the reading light which is irradiated to the prism 1 is reflected by the dichroic filter 4, and is emitted from prism 1 and then irradiated so that it is substantially perpendicular to the spatial light modulator $SLM_1b$ of reflector type.

In the display apparatus shown in FIG. 10, the reading light that is emitted from the projection lens Lp and is substantially parallel is irradiated to the dichroic prism DP of a 3-color splitting and synthesis optical system $CSA_2$.

The 3-color splitting and synthesis optical system $CSA_2$ shown in FIG. 10 has optical path length compensation prisms Pr and Pb added to the dichroic prism DP that is used as the three-color splitting and synthesis optical system in the display apparatus described with respect to FIG. 8. So the information for the three colors is obtained from the spatial light modulators $SLM_1r$, $SLM_1g$ and $SLM_1b$ for each of the colors, which are in the in line and on the same plane.

In the display apparatus shown in FIG. 10, the reading light that is emitted from the projection lens Lp in the status where it is substantially parallel is irradiated to the dichroic prism DP of the 3-color splitting and synthesis optical system $CSA_2$.

The dichroic prism DP splits the reading light that is irradiated thereto, into three colors. Of that light that is color split into three colors by the dichroic prism DP, the reading light that is of the red color and which is split by the dichroic prism DP, is reflected by a totally-reflecting surface Mr of the optical path length compensation prism Pr and is then irradiated to the read side in the spatial light modulator $SLM_1r$ to which information of the red image is written by the writing light WLr. The reading light that is of the green color and which is split by the dichroic prism DP, is irradiated to the read side of the spatial light modulator $SLM_1g$ to which information of the green image is written by the writing light WLg. The reading light that is of the blue color and which is split by the dichroic prism DP, is reflected by a totally reflecting surface Mb of the optical path length compensation prism Pb and is then irradiated to the read side of the spatial light modulator $SLM_1b$ to which information of the block image is written by the writing light WLb.

The status of the reading light of each color irradiated to the read side of the spatial light modulator $SLM_1r$, $SLM_1g$ and $SLM_1b$ for each color is the same as the status of the reading light that is irradiated to the read side of the spatial light modulator $SLM_1$ of reflector type described with reference to FIG. 6.

In FIGS. 9 and 10, the status of the reading light that is emitted from each transparent electrode Et2 of the spatial light modulator $SLM_1r$, $SLM_1g$ and $SLM_1b$ for each of the colors is also the same as the status of the reading light that is emitted from the transparent electrode Et2 of the spatial light modulator $SLM_1$ in the display apparatus of FIG. 6.

Then, the reading light that is emitted from each transparent electrode Et2 of the spatial light modulators $SLM_1r$, $SLM_1g$ and $SLM_1b$ for each color is irradiated to the projection lens Lp after combined together by the 3-color splitting and synthesis prism CSA 1 in FIG. 9 or by the dichroic prism DP in FIG. 10. The reading light that is focussed by the projection lens Lp passes the pinhole PH in the vicinity of the position of the spot of light of the light source LS in the reflector surface portion 13 (14) of the optical member MA and is projected onto the screen S as a color image.

Then, in FIG. 11, of that reading light that is emitted from the light source LS, the blue color reading light that has passed through a dichroic filter 10 and the condenser lens comprising lenses 6 and 7 forms a small diameter spot of light of the light source LS on the reflector surface in an optical member MAb with respect to the blue light. The reading light of the red color passes through dichroic filters 10 and 11 and the condenser lens comprising lenses 6 and 8 forms a small diameter spot of light of the light source LS on the reflector surface in an optical member MAr with respect to the red light. The read light of the green color passes through dichroic filters 10 and 11, the condenser lens comprising lenses 6 and 9 and a fully reflecting mirror 12, forms a small diameter spot of light of the light source LS on the reflector surface in an optical member MAg with respect to the red light.

The operation of the display apparatus for each color in the display apparatus of FIG. 11 is the same as the operation of the display apparatus described with respect to FIG. 6, and the light emitted from the display apparatus of each color shown in FIG. 11 is combined on the screen S and displays a color image thereon.

Figure 12:
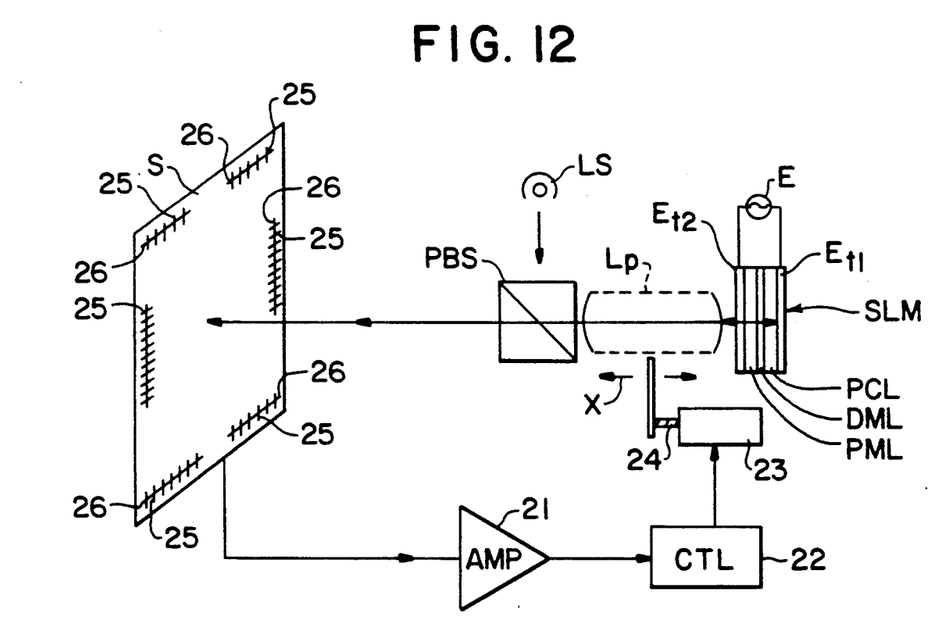

FIG. 12 shows a tenth embodiment of the display apparatus of the present invention. In this display apparatus shown in FIG. 12, the configuration and operation of the read light light source LS, the projection lens Lp, the reflector type spatial light modulator SLM, the polarization beam splitter PBS, and the screen S are clear from the description with respect to FIGS. 1 to 11, and so a detailed description will be omitted here.

With the display apparatus described above, it is possible to display an image at high resolution and having a high contrast ratio but in a display apparatus that can project high resolution images as described above, it is possible to recognize that the degree of resolution of the image changes even if there is a slight displacement of the projection lens Lp due to vibration or the like.

So that the display apparatus shown in FIG. 12 does not cause such problems, the projection lens Lp can have automatic control by an automatic focussing control system. Such an automatic focussing control system for the projection lens Lp has sensors such as line image sensors 26, 26, . . . for image information detection disposed in a portion that is not used for the display of an image, such as a portion the periphery of the screen S. Furthermore, predetermined patterns 25, 25, . . . for the detection of image information are placed on the line sensors 26, 26, . . . so as to be displayed by the display apparatus. The projection lens Lp is displaced by a motor 23 and a displacement apparatus 24 in the direction indicated by an arrow X so that the high-frequency component of image signals detected by these image information detection sensors 26, 26, . . . becomes maximum.

More specifically, the predetermined pattern 25, 25, . . . for image information detection and which is projected onto the display screen S by the display apparatus is detected by the image information detection sensors 26, 26, . . . and the obtained image information is amplified by an amplifier 21 and applied to a control circuit 22. Control signals generated by the control circuit 22 are used to drive the motor 23 so that the rotational force of the motor 23 drives the displacement apparatus 24 to displace the projection lens Lp in the direction of the optical axis.

The predetermined patterns 25, 25, . . . for image information detection and which is to be projected from the display apparatus may be superimposed as pattern signals on the information to be written that is applied to the spatial light modulator SLM for example, or it can be provided as a fixed optical pattern in the peripheral portion of the spatial light modulator SLM.

While the presently preferred embodiments of the present invention have been shown and described, it is to be understood that that disclosures are for the purpose of illustration and that various changes and modifications may be made without departing from the scope of the invention as set forth in the appended claims.

What is claimed is:

1. An apparatus for displaying an image on a screen by projecting an unpolarized reading light from a light source onto a spatial light modulator of reflective type in which said image is written, and projecting a reflected light from said modulator corresponding to said image onto said screen through a projection lens, said modulator, lens and screen being provided so that their optical axes are substantially in agreement on one optical path, comprising:

converging means for converging said unpolarized reading light from said light source on said optical axis of said projection lens and located between said projection lens and said screen;

a polarization beam splitter, provided between said projection lens and said screen, for reflecting S-polarized light in said unpolarized reading light thus converged to said modulator via said projection lens; and said spatial light modulator having a photomodulation member of birefringence type, responsive to said S-polarized light, for generating P-polarized light corresponding to said image written in said modulator by birefringence, said P-polarized light being projected onto said screen by said projection lens via said polarization beam splitter.

2. An apparatus for displaying a color image on a screen by splitting an unpolarized reading light from a light source into three reading lights, corresponding to three primary colors respectively, projecting said reading lights onto three spatial light modulators of reflective type in which images of said colors are written respectively, combining reflected lights from said modulators, each reflected light corresponding to one of said images, to form a combined reflected light and projecting said combined reflected light onto said screen by a projection lens, said lens and screen being provided so that their optical axes are substantially in agreement on one optical path, comprising:

converging means for converging said unpolarized reading light from said light source on said optical axis of said projection lens and located between said projection lens and said screen;

a polarization beam splitter, provided between said projection lens and said screen, for reflecting S-polarized light in said unpolarized light thus converged to said projection lens;

three-color splitting means, provided between said projection lens and said modulators so that said three-color splitting means is irradiated with said S-polarized light via said projection lens, for splitting said S-polarized light into three beams of S-polarized light corresponding to said three primary colors respectively, and for guiding said three beams of S-polarized light onto said three modulators respectively; and said three-color splitting means having three-color synthesis means for combining said reflected lights from said modulators to form said combined reflected light which is projected onto said screen by said projection lens via said polarization beam splitter.

3. The apparatus according to claim 2, wherein said modulators comprise photomodulation members for scattering said three beams of S-polarized light according to said images to generate first linearly polarized reflected lights parallel to optical axes of said modulators and second linearly polarized reflected lights not parallel to said optical axes, respectively.

4. The apparatus according to claim 3, further comprising:

polarization plane rotation means provided between said three-color splitting means and said lens for rotating said polarization plane of said S-polarized light so that said S-polarized light is converted into circularly polarized light which is radiated to said three-color splitting means via said projection lens; and light splitting means provided between said converging means and screen on said optical path for passing a first combined reflected light which is formed by combining said first linearly polarized reflected lights by said three-color synthesis means to said screen and reflecting a second combined reflected light which is formed by combining said second linearly polarized reflected lights by said three-color synthesis means.

5. The apparatus according to claim 4, wherein said light splitting means comprises an aperture through which said first combined reflected light passes and a reflection member which reflects said second combined reflected light.

6. The apparatus according to claim 3, wherein said converging means comprises an aperture which passes a first combined reflected light which is formed by combining said first linearly polarized reflected lights by said three-color synthesis means to said screen and a reflection member which reflects a second combined reflected light which is formed by combining said second linearly polarized reflected lights by said three-color synthesis means.

7. The apparatus according to claim 2, further comprising compensation means for compensating optical path lengths between said three-color splitting means and said modulators for differences of said optical path lengths because of locations of said modulators with respect to said three-color splitting means.

8. An apparatus for displaying an image on a screen by projecting a unpolarized reading light from a light source onto a spatial light modulator of reflective type in which said image is written, and projecting a reflected light from said modulator corresponding to said image onto said screen through a projection lens, said modulator, lens and screen being provided so that their optical axes are substantially in agreement on one optical path, comprising:

converging means for converging said unpolarized reading light from said light source on a position which is in the vicinity of a focal point of said projection lens and is located between said projection lens and said screen;

polarization beam splitter, provided between said projection lens and said screen, for reflecting S-polarized light in said unpolarized reading light thus converged on said position to said projection lens, wherein said S-polarized light is converted into a parallel pencil beam by said projection lens;

polarization plane rotation means, provided between said modulator and projection lens, for rotating said polarization plane of said parallel pencil beam of said S-polarized light, so that said parallel pencil beam of S-polarized light is converted into a parallel pencil beam of circularly polarized light;

said spatial light modulator having photomodulation member for scattering said parallel pencil beam of circularly polarized light according to said image written in said modulator to generate a first linearly polarized reflected light parallel to said optical axis of said modulator and a second linearly polarized reflected light not parallel to said optical axis of said modulator, said first and second linearly polarized reflected lights being projected onto said screen via said polarization plane rotation means and said polarization beam splitter; and light splitting means provided between said polarization beam splitter and said screen on said optical path for passing said first linearly polarized reflected light to said screen and reflecting said second linearly polarized reflected light.

9. The apparatus according to claim 8, wherein said light splitting means comprises an aperture through which said first linearly polarized reflected light passes and a reflection member which reflects said second linearly polarized reflected light.

10. An apparatus for displaying an image on a screen by projecting a unpolarized reading light from a light source onto a spatial light modulator of reflective type in which said image is written, and projecting a reflected light from said modulator corresponding to said image onto said screen through a projection lens, said modulator, lens and screen being provided so that their optical axes are substantially in agreement on one optical path, comprising:

converging means for converging said unpolarized reading light from said light source on a position which is in the vicinity of a focal point of said projection lens and is located between said projection lens and said screen;

a polarization splitter, having an aperture and a reflection member, provided between said projection lens and said screen, for reflecting S-polarized light in said unpolarized reading light thus converged on said position to said modulator via said projection lens, wherein said S-polarized light is converted into a parallel pencil beam by said projection lens; and said spatial light modulator having photomodulation means for scattering said parallel pencil beam according to said image to generate a first linearly polarized reflected light parallel to said optical axis of said modulator and a second linearly polarized reflected light not parallel to said optical axis of said modulator, wherein said first linearly polarized reflected light is projected onto said screen through said aperture of said polarization beam splitter and said second linearly polarized reflected light is reflected by said reflection member of said polarization beam splitter.

* * * * *